US008204227B2

(12) United States Patent
Itoh

(10) Patent No.: US 8,204,227 B2
(45) Date of Patent: Jun. 19, 2012

(54) INFORMATION PROCESSING APPARATUS, CONTROL METHOD THEREOF, AND COMPUTER PROGRAM

(75) Inventor: Fumiaki Itoh, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1129 days.

(21) Appl. No.: 11/491,263

(22) Filed: Jul. 24, 2006

(65) Prior Publication Data

US 2007/0022290 A1    Jan. 25, 2007

(30) Foreign Application Priority Data

Jul. 25, 2005    (JP) ................................ 2005-214329

(51) Int. Cl.
*G06F 21/00* (2006.01)
(52) U.S. Cl. ........................................ 380/277; 713/168
(58) Field of Classification Search .................. 380/277; 713/168
See application file for complete search history.

(56) References Cited

U.S. PATENT DOCUMENTS

| 6,317,823 | B1 | 11/2001 | Wakai et al. ............... 712/220 |
| 6,631,373 | B1 | 10/2003 | Otani et al. ............... 707/5 |
| 6,928,551 | B1* | 8/2005 | Lee et al. ............... 713/165 |
| 7,096,355 | B1* | 8/2006 | Marvit et al. ............... 713/162 |
| 2001/0049604 | A1 | 12/2001 | Ito et al. ............... 704/270.1 |
| 2002/0112168 | A1* | 8/2002 | Filipi-Martin et al. ....... 713/183 |
| 2002/0176580 | A1* | 11/2002 | Horiuchi et al. ............... 380/270 |
| 2003/0028431 | A1* | 2/2003 | Kawahara ............... 705/14 |
| 2003/0120942 | A1* | 6/2003 | Yoshida et al. ............... 713/193 |
| 2004/0233468 | A1 | 11/2004 | Ibaraki et al. ............... 358/1.13 |
| 2005/0027862 | A1* | 2/2005 | Nguyen et al. ............... 709/225 |
| 2006/0088167 | A1* | 4/2006 | Bade et al. ............... 380/281 |
| 2006/0136732 | A1* | 6/2006 | Vandermolen ............... 713/178 |
| 2007/0067622 | A1* | 3/2007 | Nakano et al. ............... 713/163 |

FOREIGN PATENT DOCUMENTS

| EP | 1603044 | 12/2005 |
| JP | 10-214214 | 8/1998 |
| JP | 2004-259262 | 9/2004 |

* cited by examiner

*Primary Examiner* — Vivek Srivastava
*Assistant Examiner* — Anthony Brown
(74) *Attorney, Agent, or Firm* — Fitzpatrick, Cella, Harper & Scinto

(57) ABSTRACT

An apparatus includes a first storage unit configured to store first data to be backup, an encryption unit configured to generate second data by encrypting the first data by using a cryptographic key, a second storage unit configured to store the second data together with a first identifier of the first data, a third storage unit configured to store the cryptographic key used in the encryption of the first data, in association with the first identifier of the first data, an instruction acceptance unit configured to accept a deletion instruction for the first data stored in the first storage unit, and a deletion unit configured to delete, from the third storage unit in accordance with the deletion instruction, the cryptographic key associated with the first identifier of the first data for which the deletion instruction is accepted.

9 Claims, 10 Drawing Sheets

F I G. 9
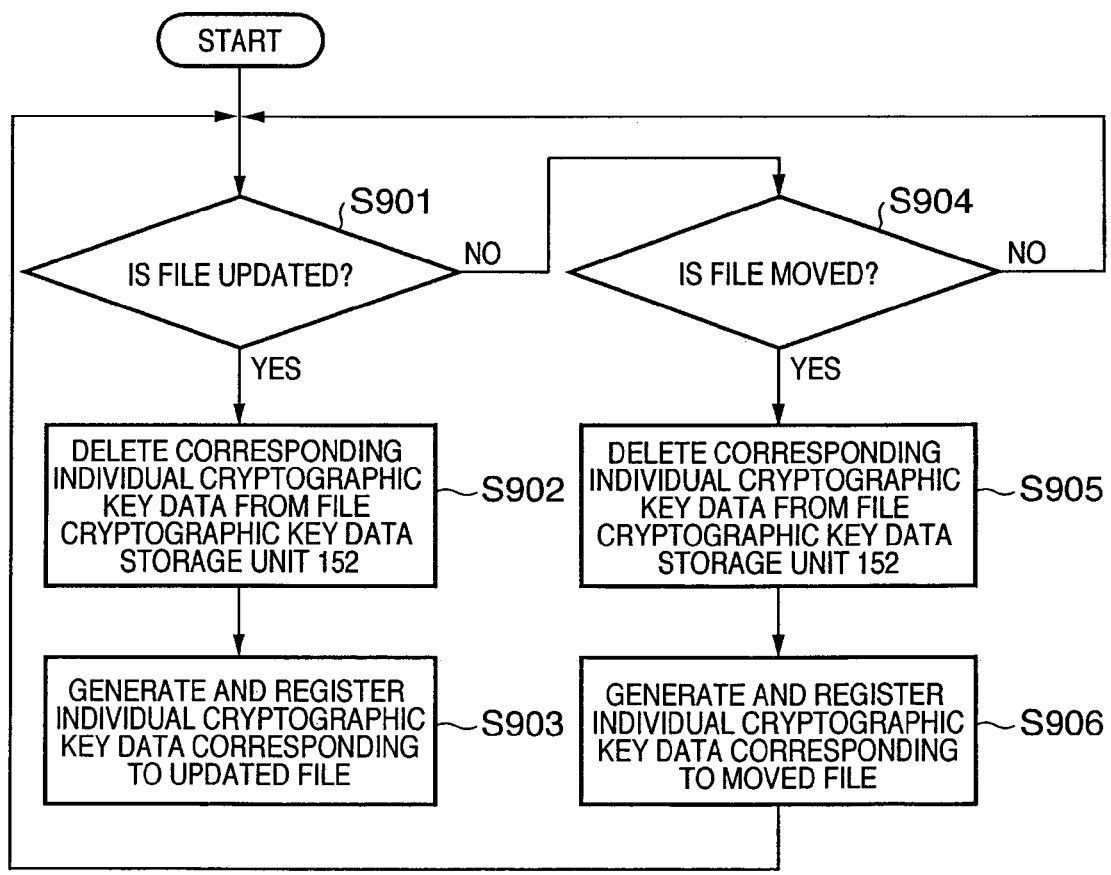

INFORMATION PROCESSING APPARATUS, CONTROL METHOD THEREOF, AND COMPUTER PROGRAM

BACKGROUND OF THE INVENTION

1. Field of the Invention

The present invention relates to an information processing apparatus, a control method of the same, and a computer program.

2. Description of the Related Art

To back up data electronically stored in various devices, the conventional approach is to back up the data in external storage devices different from the devices storing the original data. Especially when data is to be periodically backed up, the data is often backed up in an offline medium such as a magnetic tape, CD-R, or DVD-R by using a writing apparatus for the medium.

For example, when all or some of files stored in a hard disk drive as a storage device of a general-purpose computer are to be backed up, the backup data can be recorded on a magnetic tape by using a tape drive connected to the computer. The backup data may also be recorded on a DVD-R disk by using a DVD-R drive.

The backup methods are roughly classified into full backup and incremental backup. Full backup is a method which backs up all files to be backup when backup is to be performed. In one full backup method, a file to be backup is archived by using an archive command such as a tar command of the UNIX (registered trademark) operating system, thereby forming backup data. In another full backup method, backup data which is the same as a file to be backup is formed. Incremental backup is a method which backs up only files which have been added and/or updated since the last backup. To restore the data, therefore, the data must be combined with the last backup data.

It is also possible to restore data by combining full backup data and incremental backup data. However, this method has the problem that files which have been deleted from the timing of full backup to the timing of incremental backup are also restored. To solve this problem, a method which records identification data of files deleted from the full backup timing to the incremental backup timing and does not restore the deleted data during restoration is proposed (Japanese Patent Laid-Open No. 10-214214).

In the conventional backup methods, however, even when data stored in various devices for backup is to be completely deleted, it is difficult to delete this data alone from the backup data. For example, when backup data is to be formed by full backup, it is difficult to delete only a specific file from the backup data. This poses the problem that even when the original data is deleted, the same data as the original data remains in the backup data.

Even when backup data has the same contents as the original, if this backup data is recorded on an unrewritable offline medium such as a DVD-R disk, no specific file alone can be deleted. Accordingly, the only way to delete the backup data is to physically destroy the whole medium. Note that if a backup medium is a rewritable medium such as a DVD-RW, a specific file alone can be deleted.

When full backup is periodically performed, however, a large number of offline media storing backup data may exist. If a specific file alone is to be deleted in a case like this, it is necessary to delete this file alone from all the large number of offline media. This makes it necessary to repetitively perform the process of loading each offline medium into a recording apparatus, and deleting the specific file. The process is cumbersome, and is also unrealistic from the viewpoint of cost. Incremental backup also has the same problem.

Recently, Personal Information Protection Act is established, so it is required to make unnecessary data completely unusable more often than before. Accordingly, the inability to delete backup data as described above may have serious influence from the viewpoint of protection and management of personal information.

SUMMARY OF THE INVENTION

In the present invention, data contained in backup data and corresponding to data deleted from original data is made unusable.

The present invention according to one aspect of one of the preferred embodiments is an information processing apparatus comprising a first storage unit configured to store first data to be backup, an encryption unit configured to generate second data by encrypting the first data using a cryptographic key, a second storage unit configured to store the second data together with a first identifier of the first data, a third storage unit configured to store the cryptographic key used in the encryption of the first data, in association with the first identifier of the first data, an instruction acceptance unit configured to accept a deletion instruction for the first data stored in the first storage unit, and a deletion unit configured to delete, from the third storage unit, the cryptographic key associated with the first identifier of the first data for which the deletion instruction is accepted.

Further features of the present invention will become apparent from the following description of exemplary embodiments (with reference to the attached drawings).

BRIEF DESCRIPTION OF THE DRAWINGS

FIG. 9 is a flowchart showing an example of a file changing process according to the third embodiment of the present invention.

DESCRIPTION OF THE EMBODIMENTS

Preferred embodiments of the present invention will now be described in detail in accordance with the accompanying drawings.

[First Embodiment]

Figure 1:
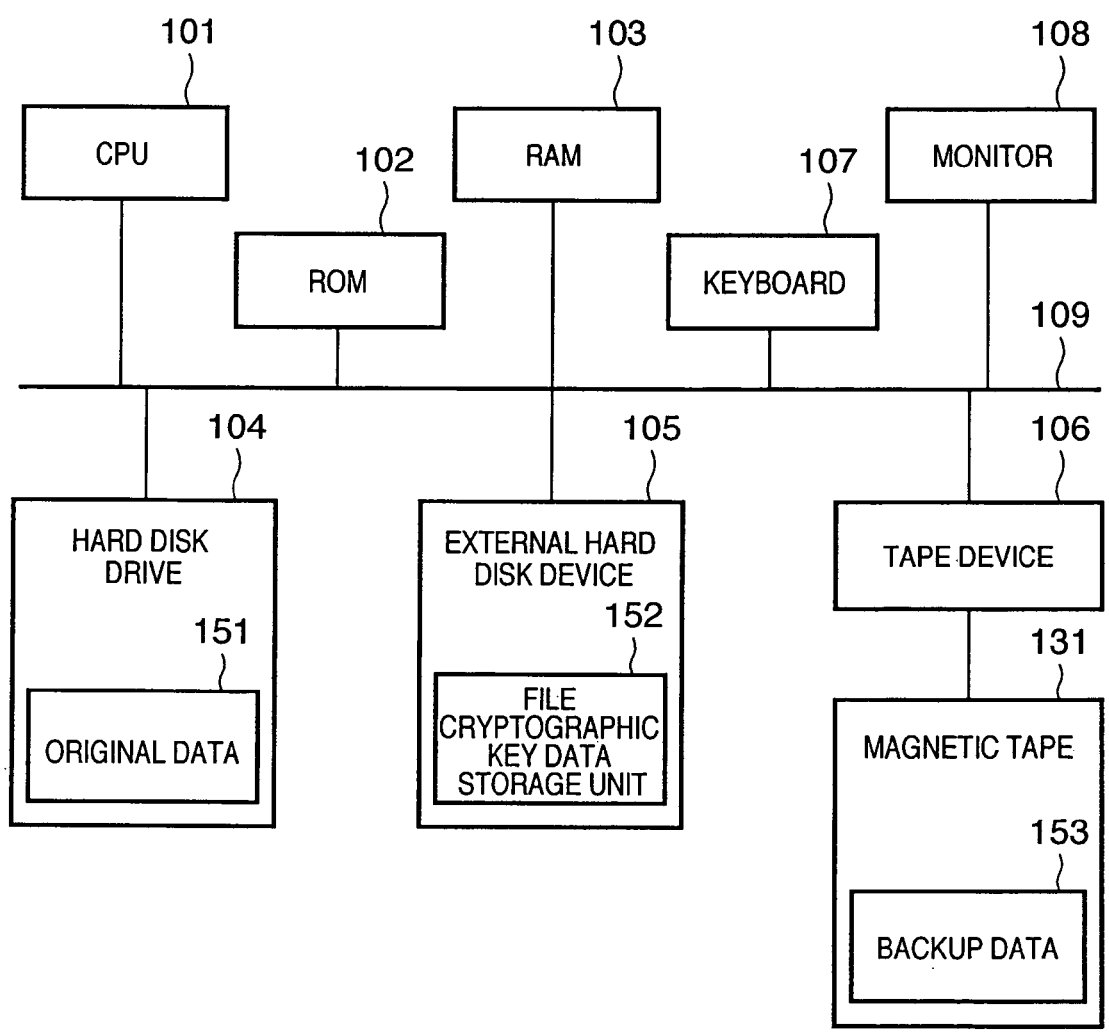
FIG. 1 is a block diagram showing an example of the arrangement of an information processing apparatus according to an embodiment of the present invention.

FIG. 1 is a block diagram which shows the arrangement of an information processing apparatus capable of executing backup management processing according to the first embodiment of the present invention, and explains principal data stored in individual units. This information processing apparatus can be implemented by a general-purpose computer or the like.

Referring to FIG. 1, a CPU 101 is a central processing unit which controls the whole information processing apparatus. A ROM 102 is a read only memory which stores control programs requiring no change and parameters. A RAM 103 is a random access memory which temporarily stores programs and data supplied from external apparatuses. A hard disk drive 104 is fixedly installed in the information processing apparatus. The hard disk drive 104 stores processing programs according to this embodiment, and original data 151 to be backup by the backup management processing.

A hard disk device 105 is an external hard disk drive, and registers, in a file cryptographic key data storage unit 152, information concerning cryptographic key data which changes from one file to be backup to another. A tape device 106 inputs and outputs data to and from a magnetic tape 131. Backup data 153 of the original data 151 is recorded on the magnetic tape 131. A keyboard 107 accepts data input and operations from a user. A monitor 108 displays data to the user. A system bus 109 connects the units 101 to 108 so that they can communicate with each other.

In this embodiment, the original data 151 means all files under a particular directory of file groups managed in a hierarchical structure by the operating system (OS) of the information processing apparatus. Also, each file is one data item. For example, when a directory "/target/" is the top directory of original data, file groups under "/target/" are objects of backup. In this embodiment, backup is performed to restore data stored in the hard disk drive 104 if the hard disk drive 104 is damaged and the stored data is lost. The backup data 153 is obtained by storing, for the purpose of backup, the original data 151 to be backup in a storage unit (the magnetic tape in FIG. 1) other than a storage unit (the hard disk drive 104 in FIG. 1) storing the data. In this embodiment, files except for those present under "/target/" are files which can be restored by another method, e.g., files configuring the operating system. That is, all files requiring backup are formed under "/target/". Backup data does not include any data which the user forms by copying original data in order to, e.g., edit the data or change the storage location of the data.

Individual files forming the original data 151 can be identified by relative paths from the top directory of the original data. For example, a file "/target/sub1/file1" can be identified by a relative path "sub1/file1". Data of the relative path for identifying a file is specifically called identification data in this embodiment. Note that the OS gives ID for identifying each file in some cases. If this ID is usable, the ID may also be used as identification data.

The last update date/time is stored in each file by the function of the OS. In the backup management processing according to this embodiment, therefore, the update date/time of a file can be read out via the OS.

Practical contents of the backup management processing according to this embodiment will be explained below. Unless otherwise specified, the process of each step to be explained below is implemented when the program of the backup management processing stored in the hard disk drive 104 is read out to the RAM 103, and executed under the control of the CPU 101.

Figure 2:
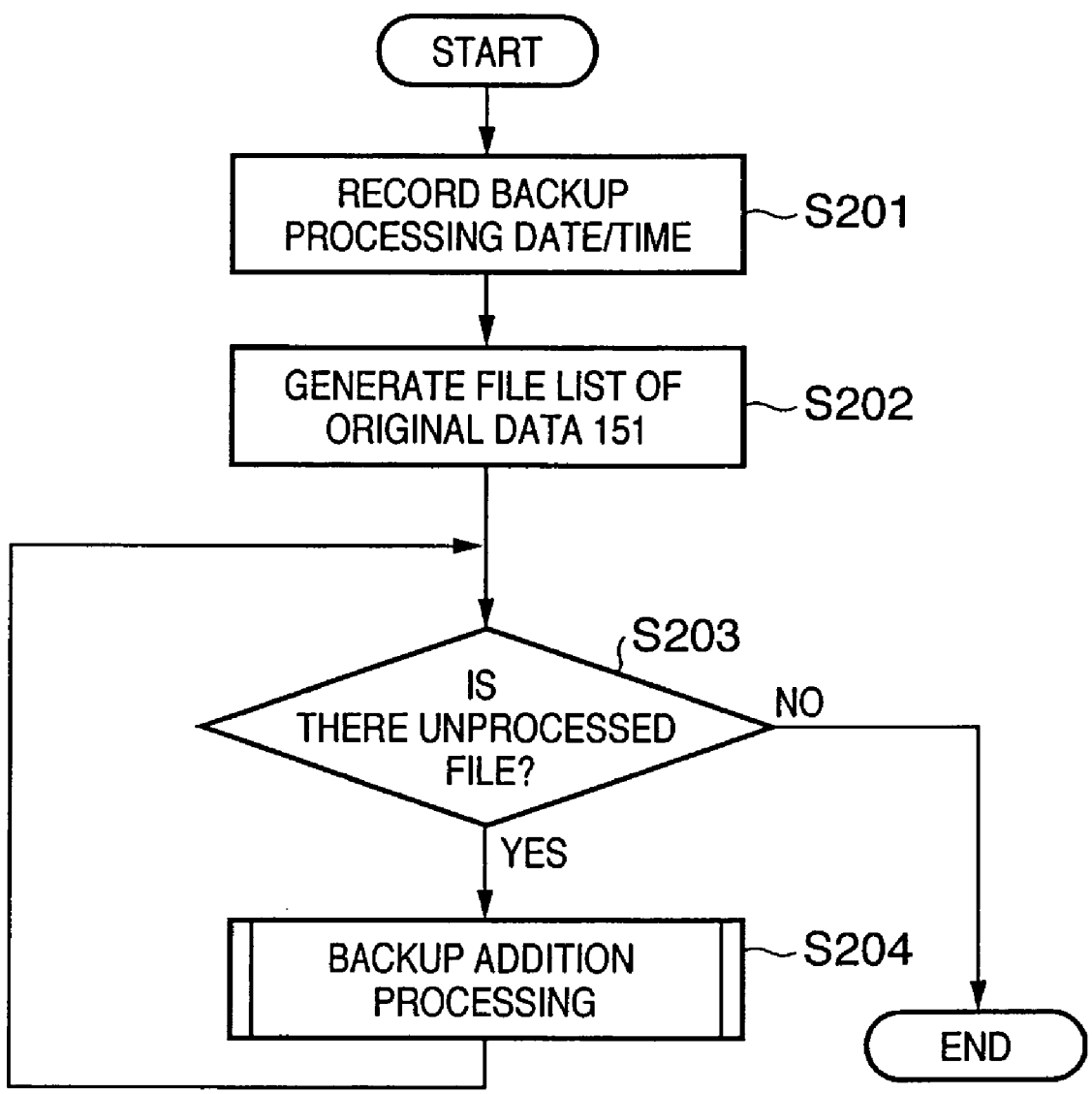
FIG. 2 is a flowchart showing an example of full backup processing according to the embodiment of the present invention.

First, an example of full backup processing of the backup management processing according to this embodiment will be explained with reference to FIG. 2. This full backup processing is activated by the OS or the like when a preset date/time comes, or activated when a predetermination operation from the user is accepted via the keyboard 107.

First, in step S201, the CPU 101 records the present date/time as a backup processing date/time in a backup processing date/time recording unit. Note that in this embodiment, the backup processing date/time recording unit is preferably secured in the hard disk drive 104. Then, in step S202, the CPU 101 uses the function of the OS to list up all files forming the original data 151, thereby forming a file list.

In step S203, the CPU 101 determines whether the file list formed in step S202 contains an unprocessed file not having undergone backup addition processing in step S204 (to be described below). Since a file having undergone the backup addition processing is deleted from the file list, it is possible to determine that there is no unprocessed file if the file list is empty. It is also possible to form a process completion indicating flag in the file list, instead of deleting a file from the file list. In this case, the determination can be performed in accordance with whether there is a file whose process completion indicating flag is "OFF". If there is an unprocessed file ("YES" in step S203), the flow advances to step S204. If there is no unprocessed file ("NO" in step S203), the CPU 101 terminates the full backup processing.

In step S204, the CPU 101 selects one unprocessed file, and performs the backup addition processing on the basis of the identification data of the file. Details of the backup addition processing will be described later with reference to FIG. 4. In this step, the CPU 101 also deletes the processed file from the file list. When the process completion indicating flag is to be used, the CPU 101 turns on the process completion indicating flag of the processed file. After that, the flow returns to step S203.

An example of incremental backup processing of the backup management processing according to this embodiment will be explained below with reference to FIG. 3. This incremental backup processing is activated by the OS when a preset date/time comes, or activated when a predetermined operation from the user is accepted via the keyboard 107. Also, the incremental backup processing is desirably performed at an interval shorter than the interval of the full backup processing.

Figure 3:
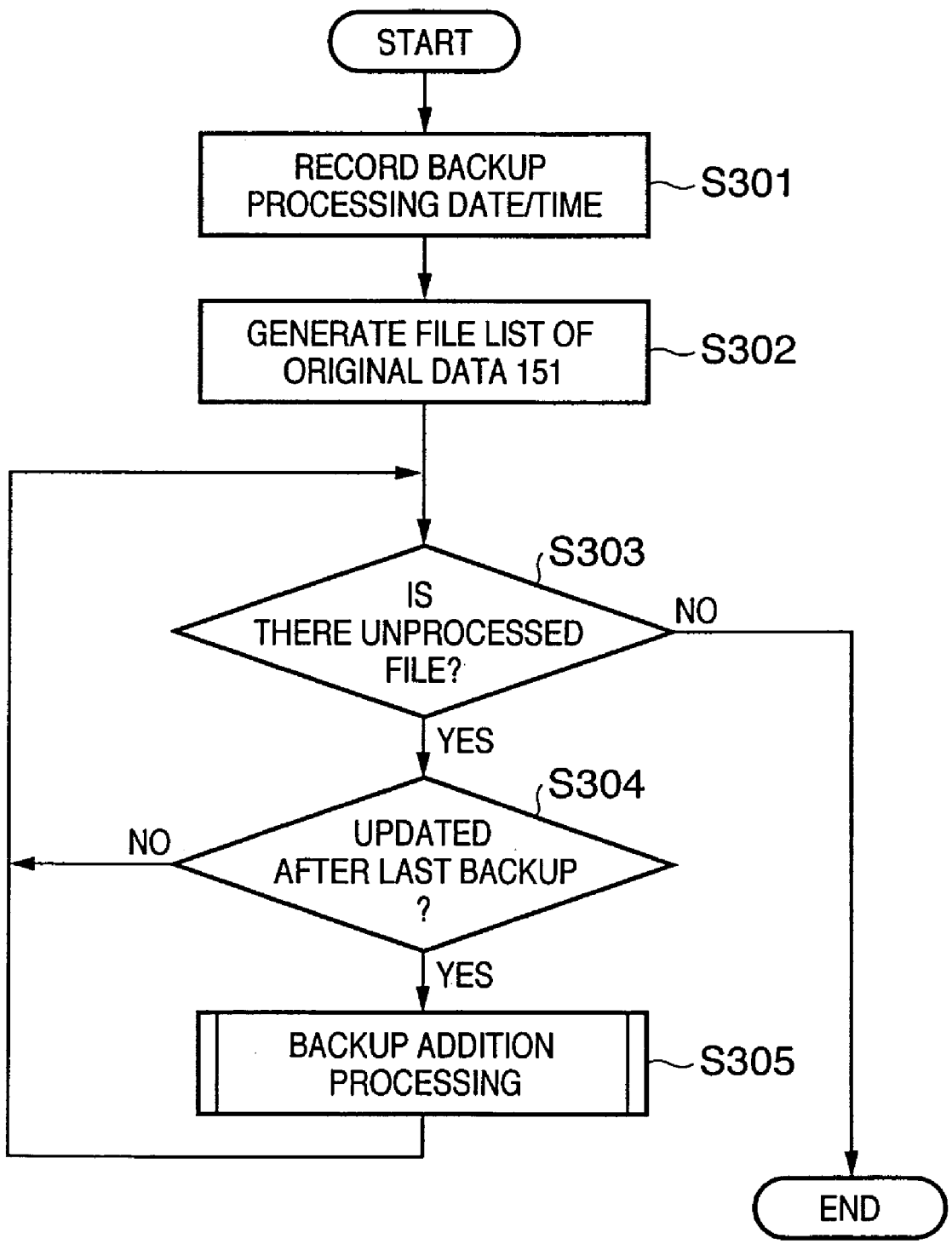
FIG. 3 is a flowchart showing an example of incremental backup processing according to the embodiment of the present invention.

First, in step S301 of FIG. 3, the CPU 101 records the present date/time as a backup processing date/time in the backup processing date/time recording unit in the hard disk drive 104. Then, in step S302, the CPU 101 uses the function of the OS to list up all files forming the original data 151, thereby forming a file list.

In step S303, the CPU 101 determines whether the file list formed in step S302 contains an unprocessed file not having undergone the backup addition processing. This process is the same as step S203 in FIG. 2. If there is an unprocessed file ("YES" in step S303), the flow advances to step S304. If there is no unprocessed file ("NO" in step S303), the CPU 101 terminates the incremental backup processing.

In step S304, the CPU 101 selects one unprocessed file, and acquires the update date/time of the selected file by using the function of the OS. The CPU 101 then compares the file update date/time with the last backup date/time recorded in the backup processing date/time recording unit. If the file update date/time is later than the last backup date/time ("YES" in step S304), the flow advances to step S305. If the file update date/time is earlier than the last backup date/time ("NO" in step S304), the flow returns to step S303.

In step S305, the CPU 101 performs the backup addition processing on the basis of the identification data of the file selected in step S304. Details of the backup addition processing will be described later with reference to FIG. 4. In this step, the CPU 101 also deletes the processed file from the file list. When the process completion indicating flag is to be used, the CPU 101 turns on the process completion indicating flag of the processed file. After that, the flow returns to step S303.

The overall flows of the full backup processing and incremental backup processing according to this embodiment are explained above. However, the present invention does not depend on the above-mentioned form alone. For example, in the incremental backup processing, a file as an object of the backup addition processing is selected on the basis of the update date/time. However, it is also possible to prepare, for each file, a flag indicating whether to execute the backup processing, and select a file to be processed on the basis of this flag.

Also, depending on the type of OS, such flags are prepared beforehand, and each flag is turned on when the file is updated and turned off when the file is backed up. When these flags are used, incremental backup can be performed by backing up only files having ON flags. Furthermore, in incremental backup, only files updated after the last incremental backup are backed up. However, files updated after the last full backup may also be backed up. This is achieved by not executing step S301 of the incremental backup processing.

Figure 4:
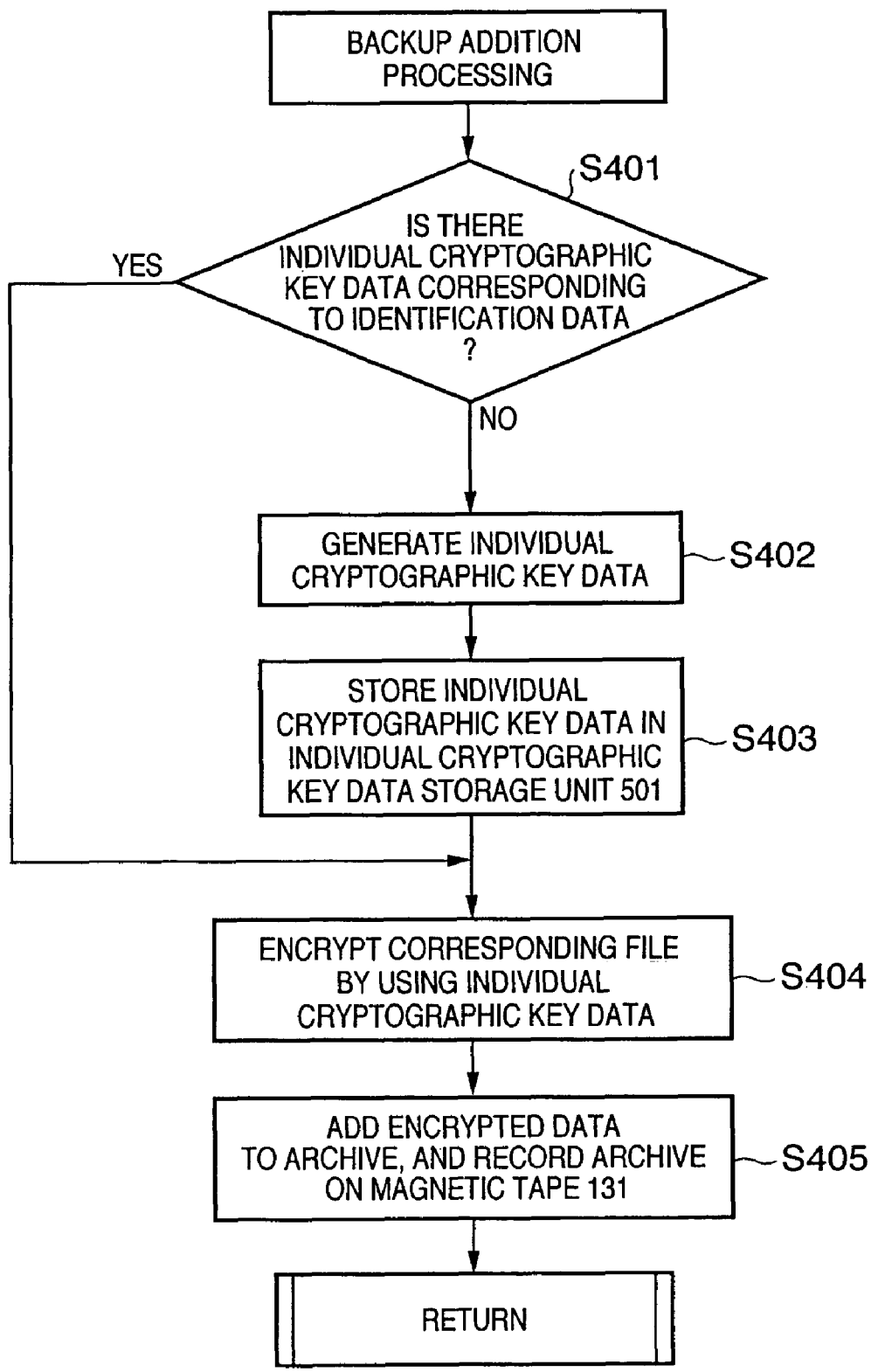
FIG. 4 is a flowchart showing an example of backup addition processing according to the embodiment of the present invention.

The backup addition processing executed in step S204 of the full backup processing shown in FIG. 2 and step S305 of the incremental backup processing shown in FIG. 3 will be explained below. FIG. 4 is a flowchart showing an example of the backup addition processing.

Figure 5A:
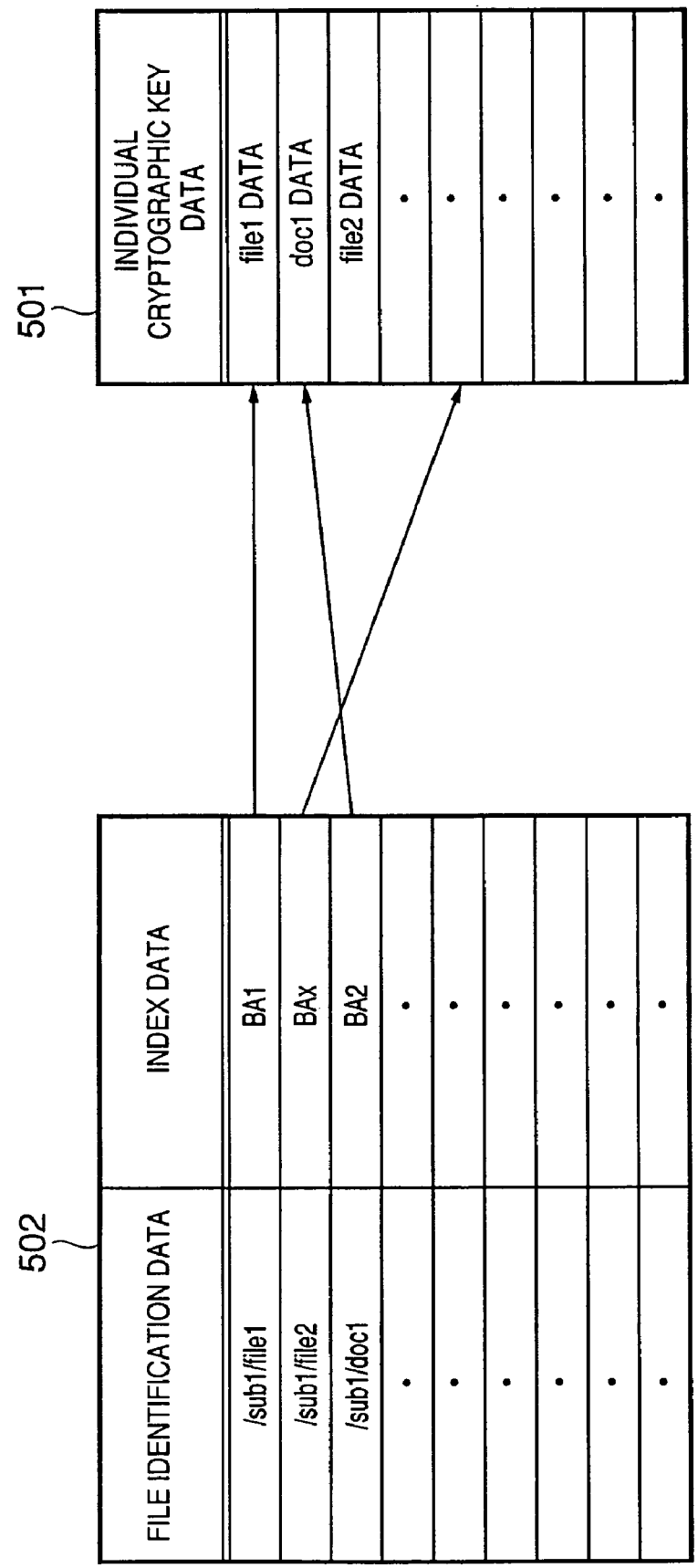
FIG. 5A is a view showing an example of the data structure in a file cryptographic key data storage unit 152 according to the embodiment of the present invention.

In step S401, on the basis of the identification data of the file, the CPU 101 determines whether individual cryptographic key data assigned to the file is registered in the file cryptographic key storage unit 152. FIG. 5A shows an example of the data structure of data registered in the file cryptographic key data storage unit 152.

Referring to FIG. 5A, an individual cryptographic key data storage unit 501 stores individual cryptographic key data assigned to each file. The individual cryptographic key data has a fixed length, and the individual cryptographic key data storage unit 501 is formed by a series of blocks having this length. Each block stores one individual cryptographic key assigned to one file. An individual cryptographic key index storage unit 502 stores the index of individual cryptographic key data. The individual cryptographic key index storage unit 502 stores index data having, as its value, the address (Block Address: BA) of a block storing the individual cryptographic key data of each file, by using the identification data of the file as a key. FIG. 5A is a logical view for explanation. In practice, the index data can be stored by a data structure such as a B-tree.

In the file cryptographic key data storage unit 152, the identification data and the individual cryptographic key data for encrypting a file are registered as they are associated with each other. With this structure, it is possible to search the individual cryptographic key index storage unit 502 by using the identification data as a key, and determine that there is a file cryptographic key if the index data is detected. If it is determined that there is individual cryptographic key data ("YES" in step S401), the CPU 101 sets the found individual cryptographic key data as cryptographic key data to be used in the subsequent processing, and the flow advances to step S404. If it is determined that there is no individual cryptographic key data ("NO" in step S401), the flow advances to step S402.

In step S402, the CPU 101 generates new individual cryptographic key data for a file corresponding to the identification data. In step S403, the CPU 101 adds the individual cryptographic key data generated in step S402 to the file cryptographic key data storage unit 152. More specifically, the CPU 101 stores the individual cryptographic key data generated in step S402 into an empty block in the individual cryptographic key data storage unit 501. Then, the CPU 101 adds, to the individual cryptographic key index storage unit 502, an index having, as its value, the address of the block storing the individual cryptographic key data, by using the corresponding identification data as a key. In this step, the individual cryptographic key data generated in step S402 is set as cryptographic key data to be used in the subsequent process.

Figure 5B:
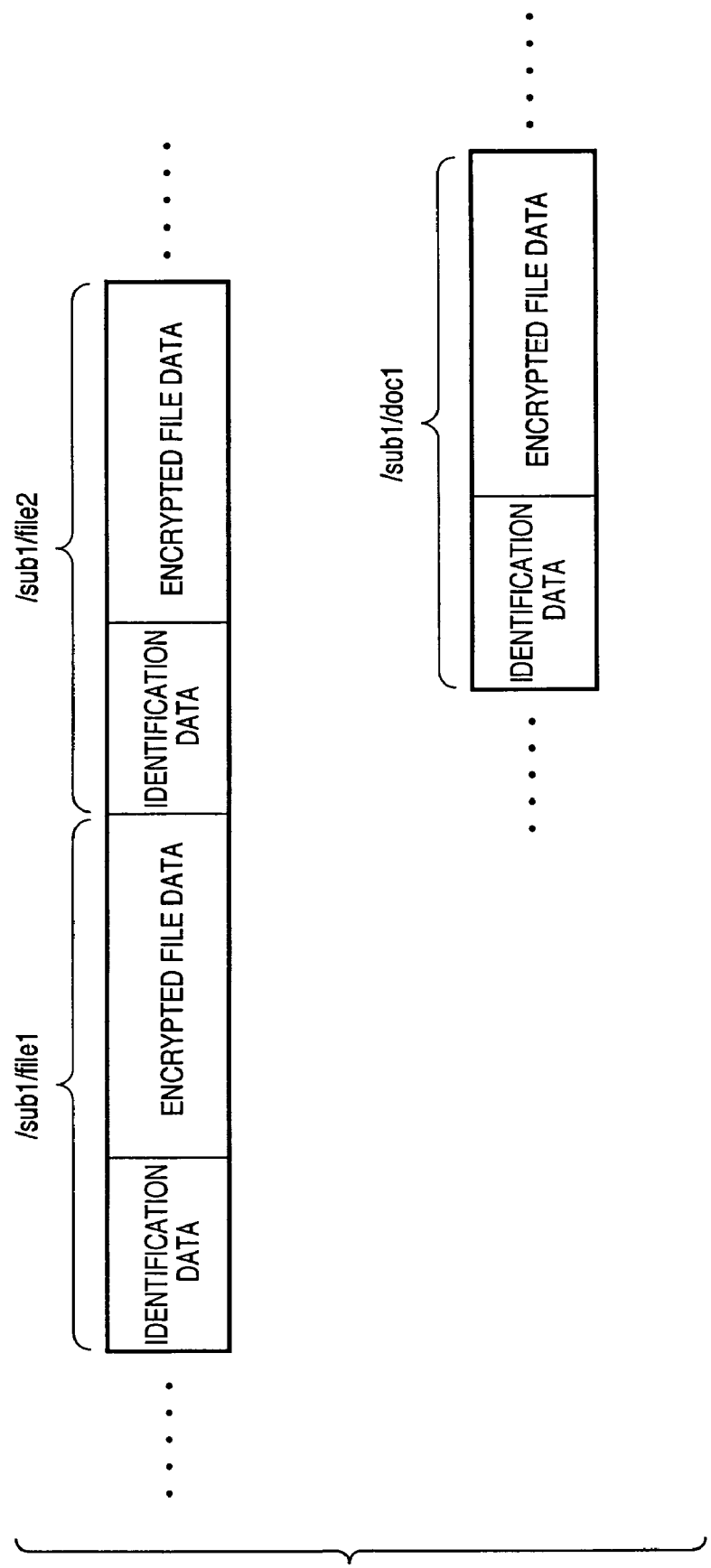
FIG. 5B is a view showing an example of the data structure of an archive according to the embodiment of the present invention.

In step S404, the CPU 101 reads out main data of the file identified by the identification data of the file by using the function of the OS. In addition, the CPU 101 encrypts the readout data by a secret key encryption method such as DES, by using, as a secret key, the individual cryptographic key data set as cryptographic key data. In step S405, the CPU 101 adds the data encrypted in step S404 to the archive, and records the archive on the magnetic tape 131. The encrypted file data and the identification data of the file are thus stored in the archive. FIG. 5B shows an example of the data structure of the archive. The backup addition processing for one file is completed as described above.

Figure 6:
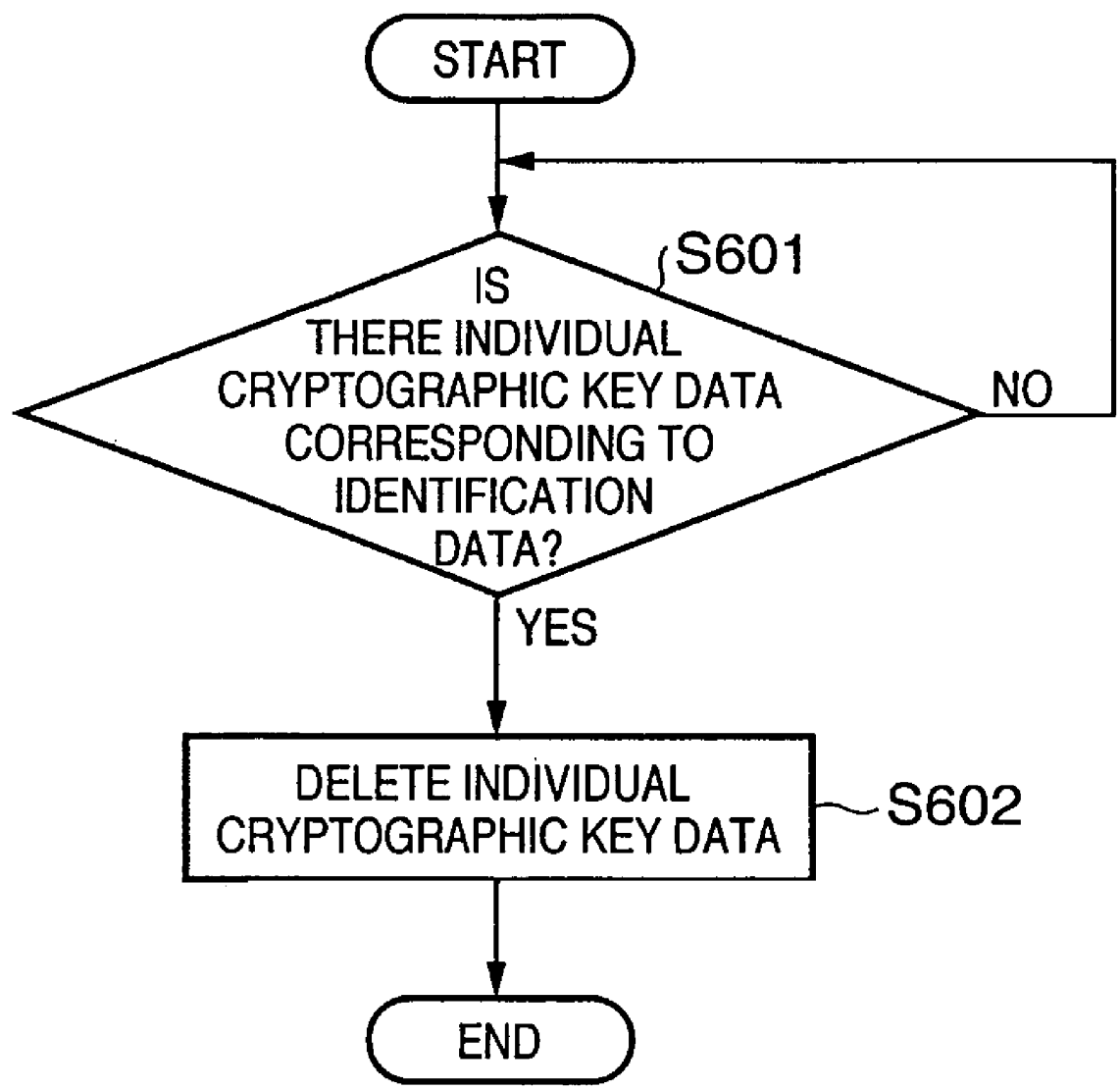
FIG. 6 is a flowchart showing an example of a file deleting process according to the embodiment of the present invention.

A process of deleting a file from the original data 151 will be explained below. This file deleing process is performed independently of the backup processing, and activated by receiving an event from the OS when a file is to be deleted by accepting a file deletion instruction from the user. FIG. 6 is a flowchart showing an example of the file deleting process.

In step S601 of FIG. 6, on the basis of the identification data of a file to be deleted, the CPU 101 determines whether there is individual cryptographic key data of the file in the file cryptographic key data storage unit 152. This process can be performed in the same manner as the process in step S401 of the backup addition processing. If it is determined that there is individual cryptographic key data ("YES" in step S601), the flow advances to step S602. If there is no individual cryptographic key data ("NO" in step S601), the file is not contained in the backup data 153, so the file deleting processing is terminated.

In step S602, the CPU 101 deletes the individual cryptographic key data of the file from the file cryptographic key data storage unit 152. More specifically, on the basis of the identification data found in step S601, the CPU 101 reads out the corresponding index data stored in the individual cryptographic key index storage unit 502. Since this index data indicates a block storing the individual cryptographic key data used in encryption of the file, the CPU 101 writes, on the basis of the index, data by which all bits in the block storing the individual cryptographic key data are changed to 0. In this manner, the corresponding individual cryptographic key data can be deleted. Since the index data and identification data stored in the individual cryptographic key index storage unit 502 are no longer necessary, the CPU 101 also deletes these data. In this way, the file deleting process is completed.

The foregoing is the backup management processing according to this embodiment. If the original data 151 is lost because, e.g., the hard disk drive 104 is damaged, the data can be restored by using the backup data 153 on the magnetic tape 131, and the file cryptographic key data storage unit 152 in the external hard disk device 105.

More specifically, the backups of the files contained in the full backup archive are sequentially restored to the hard disk drive. Note that restoration from incremental backup can also be performed in the same manner as full backup.

During the restoration, the identification data of each file indicates the storage location and file name of the file in the original data 151. Accordingly, the directory structure of the original data 151 can be restored. Since data of the file main body is encrypted, however, the individual cryptographic key data used in encryption of each file is acquired from the file cryptographic key data storage unit 152 by using the identification data as a key, and the file is restored as it is decrypted by using the key. For a file deleted from the original data 151 after backup, no corresponding individual cryptographic key data is stored in the file cryptographic key data storage unit 152. Therefore, the file is not restored because it cannot be decrypted.

That is, it is possible to prevent regeneration of a deleted file by restoration. Also, even when deleted file data is to be acquired by analyzing the backup data, the data is encrypted, and no cryptographic key of the data exists. Accordingly, no data can be acquired as the original file data.

In this embodiment as described above, when a plurality of files are to be collectively backed up in one archive, data of each file can be encrypted before being contained in the archive. Also, data used in the encryption are collectively managed as file cryptographic key data. When the original data is deleted, the corresponding cryptographic key data can also be deleted. This makes a file deleted after backup unusable even if the backup data remains.

In addition, even when backup data remains on a plurality of tapes due to periodic full backup or the like, no cryptographic key for decryption exists for a file deleted after backup, so the file cannot be used. This makes it possible to avoid the problem that data of a deleted file is illicitly used because the data remains in the backup data.

Furthermore, in this embodiment, no unique processing need be performed on backup data for data deleted from the original data. That is, when desired data is simply deleted from the original data, access to the corresponding data in backup data is disabled. This saves the user the trouble of deleting data from each of a plurality of backup data.

[Second Embodiment]

In the first embodiment explained above, backup data is stored as an archive on the magnetic tape 131 by using the tape device 106. However, the present invention is also applicable to a different backup data storage method. In this embodiment, therefore, a method of storing backup data in the same form as the original data will be explained.

Figure 7:
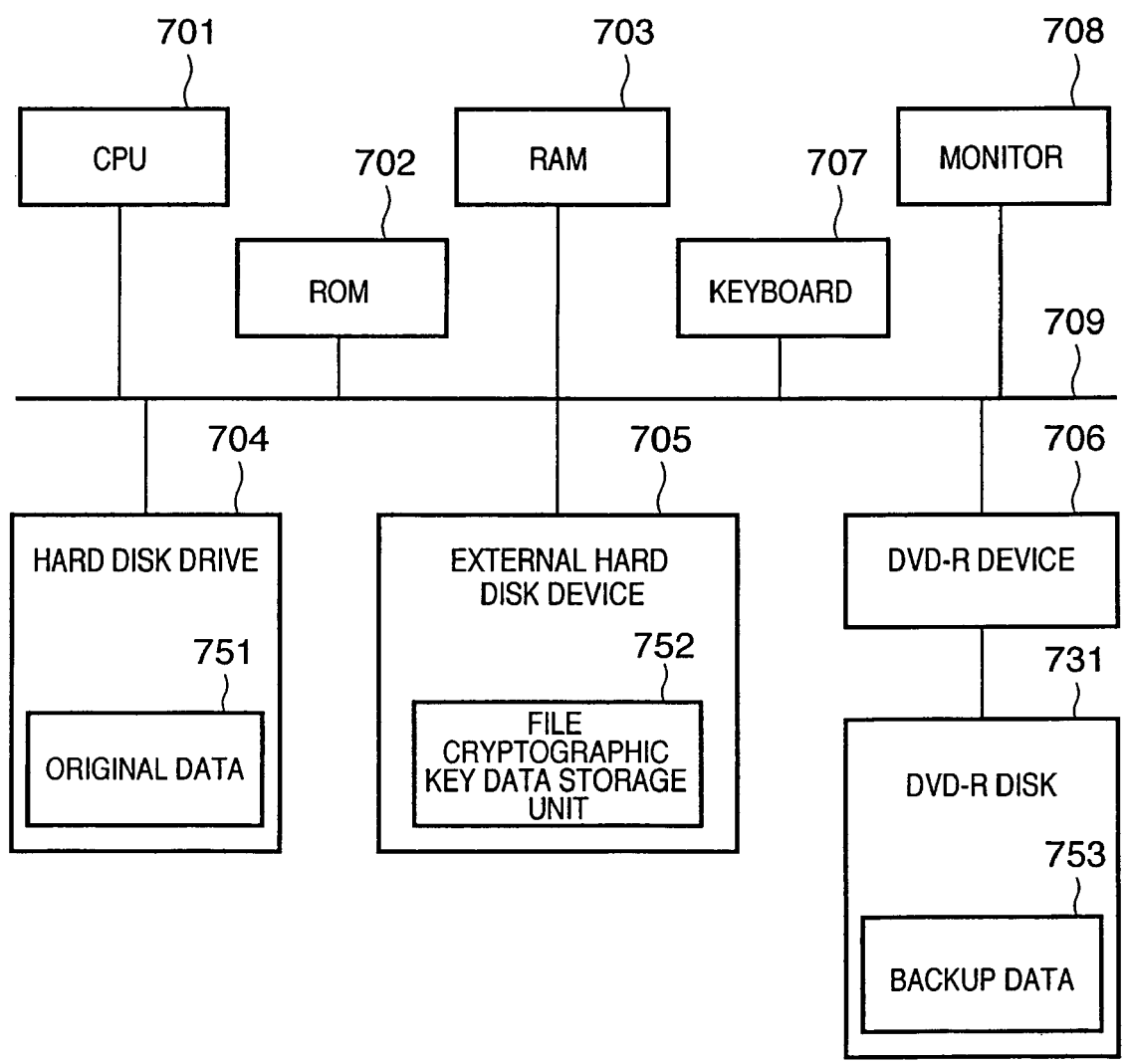
FIG. 7 is a block diagram showing an example of the arrangement of an information processing apparatus according to the second embodiment of the present invention.

FIG. 7 is a block diagram for explaining the arrangement of an information processing apparatus capable of executing backup management processing according to this embodiment, and principal data stored in individual units. In FIG. 7, reference numerals 701 to 705, 707 to 709, 751, and 752 respectively correspond to 101 to 105, 107 to 109, 151, and 152 in FIG. 1 explained in the first embodiment, so a detailed explanation thereof will be omitted.

A DVD-R device 706 inputs and outputs data to and from a DVD-R disk 731. The DVD-R disk 731 is a storage medium for writing backup data in it, but differs from the magnetic tape 131 in that the written data cannot be changed. However, the DVD-R disk 731 can store backup data 753 by the same hierarchical structure as original data 751. Therefore, the second embodiment is the same as the first embodiment except that the data structure of the backup data 753 is different from that of the backup data 153 in the first embodiment. The processing of the second embodiment is also the same as the first embodiment except that the process of addition to the archive on the magnetic tape 131 in step S405 in the first embodiment is replaced with a process of writing a file on the DVD-R disk.

The backup data 753 is formed by copying each file such that the data structure of the original data 751 remains the same. That is, each file to be backup is stored by a directory structure in which identification data of the file is the relative path from the DVD-R. In the backup processing, each encrypted file is stored in a directory complying with this structure.

When the DVD-R is thus selected as a storage medium for storing the backup data 753, even if a certain file is deleted from the original data 751, this file alone cannot be deleted from the backup data 753. To make the file unusable, therefore, the only conventional method is to physically destroy the DVD-R disk. In this case, other files in the backup data are also lost.

In this embodiment, however, individual cryptographic key data of a file deleted from the original data is erased from a file cryptographic key data storage unit 752. This makes the file unusable even when the backup data remains on the DVD-R. Accordingly, it is possible to avoid the problem that data of a deleted file is illicitly used because the file remains in backup data.

[Third Embodiment]

In the first and second embodiments described above, when a file is deleted from the original data 151 and 751, backup data of the file is made unusable. However, it is sometimes desirable to make backup data unusable not only for deletion but also for another processing for original data. For example, when a file of the original data is changed, more specifically, updated, it is sometimes desirable to make the data before the update unusable. Also, when a file is moved, it is sometimes desirable to make the data before the movement unusable.

In this embodiment, therefore, when a file is updated or/and moved, a process of deleting individual cryptographic key data for the file before the change (update or/and movement) is executed.

FIG. 9 is a flowchart showing an example of the processing according to this embodiment. In step S901 of FIG. 9, whether a file contained in the original data 151 is updated is determined. If the file is updated ("YES" in step S901), the flow advances to step S902. In step S902, individual cryptographic key data corresponding to the file before the update is deleted from an individual cryptographic key data storage unit 501 in a file cryptographic key data storage unit 152. A practical example of the deleting process is the same as explained in step S602 of FIG. 6. Note that index data and identification data stored in an individual cryptographic key index storage unit 502 are also deleted.

In step S903, individual cryptographic key data corresponding to the updated file is generated, and registered in the individual cryptographic key storage unit 501. In addition, index data and identification data corresponding to the newly generated individual cryptographic key data are registered in the individual cryptographic key index storage unit 502.

On the other hand, if no file is updated in step S901 ("NO" in step S901), the flow advances to step S904. In step S904, whether a file is moved is determined. If no file is moved ("NO" in step S904), the flow returns to step S901 to continue the processing. If a file is moved ("YES" in step S904), the flow advances to step S905. In step S905, individual cryptographic key data corresponding to the file before the movement is deleted from the individual cryptographic key storage unit 501 in the file cryptographic key data storage unit 152. A practical example of the deleting process is the same as explained in step S602 of FIG. 6. Note that index data and identification data stored in the individual cryptographic key index storage unit 502 are also deleted.

In step S906, individual cryptographic key data corresponding to the moved file is generated, and registered in the individual cryptographic key data storage unit 501. In addition, index data and identification data corresponding to the newly generated individual cryptographic key data are registered in the individual cryptographic key index storage unit 502.

After that, the newly generated individual cryptographic key data is used to encrypt the updated or moved file, and the encrypted data is added to backup data 153.

In this embodiment as described above, backup data of a file before it is changed, i.e., updated or/and moved can be made unusable. Also, in this embodiment, only backup data of the lastly changed files is usable, so restoration can be performed by using only the latest files. That is, no old files changed earlier are restored in this embodiment.

Note that when the contents of a file are updated, the identification data is not changed except when the file name is changed. In addition, when individual cryptographic key data before update is deleted and the updated file is encrypted by using new individual cryptographic key data, the file before the update cannot be decrypted. When only the contents of a file except for the file name are changed, therefore, it is only necessary to delete the individual cryptographic key data and form new individual cryptographic key data, and the old index data and identification data can be used.

Also, after a file is moved, backup data of the file before the movement is made unusable. However, it is sometimes convenient to keep the backup data before the movement usable. Accordingly, it is also possible to store individual cryptographic key data, identification data, and index data before the movement.

In step S902 or S905, before backup data of an updated or moved file is formed, individual cryptographic key data and the like of the old file are deleted. However, the file may be destroyed while it is updated or moved. Therefore, it is also possible to keep the old-backup data restorable until a backup of an updated or moved file is formed, and make the old backup data unusable after the formation of the backup of the updated or moved file is completed. This makes it possible to reliably restore a file even if the file is destroyed while it is updated or moved.

[Fourth Embodiment]

In any of the above first to third embodiments, the purpose of backup is to prevent the loss of the entire original data if the hard disk drive 104 or 704 storing the original data 151 or 751 is damaged. Another purpose of backup is to restore data deleted by the user by mistake. In this embodiment, therefore, backup processing meeting this purpose will be explained.

In this embodiment, individual cryptographic key data is not always deleted when a file is deleted; whether to delete the data is determined on the basis of prestored data or input data. The rest is the same as the file deleting process in the previous embodiments such as the first embodiment.

Figure 8:
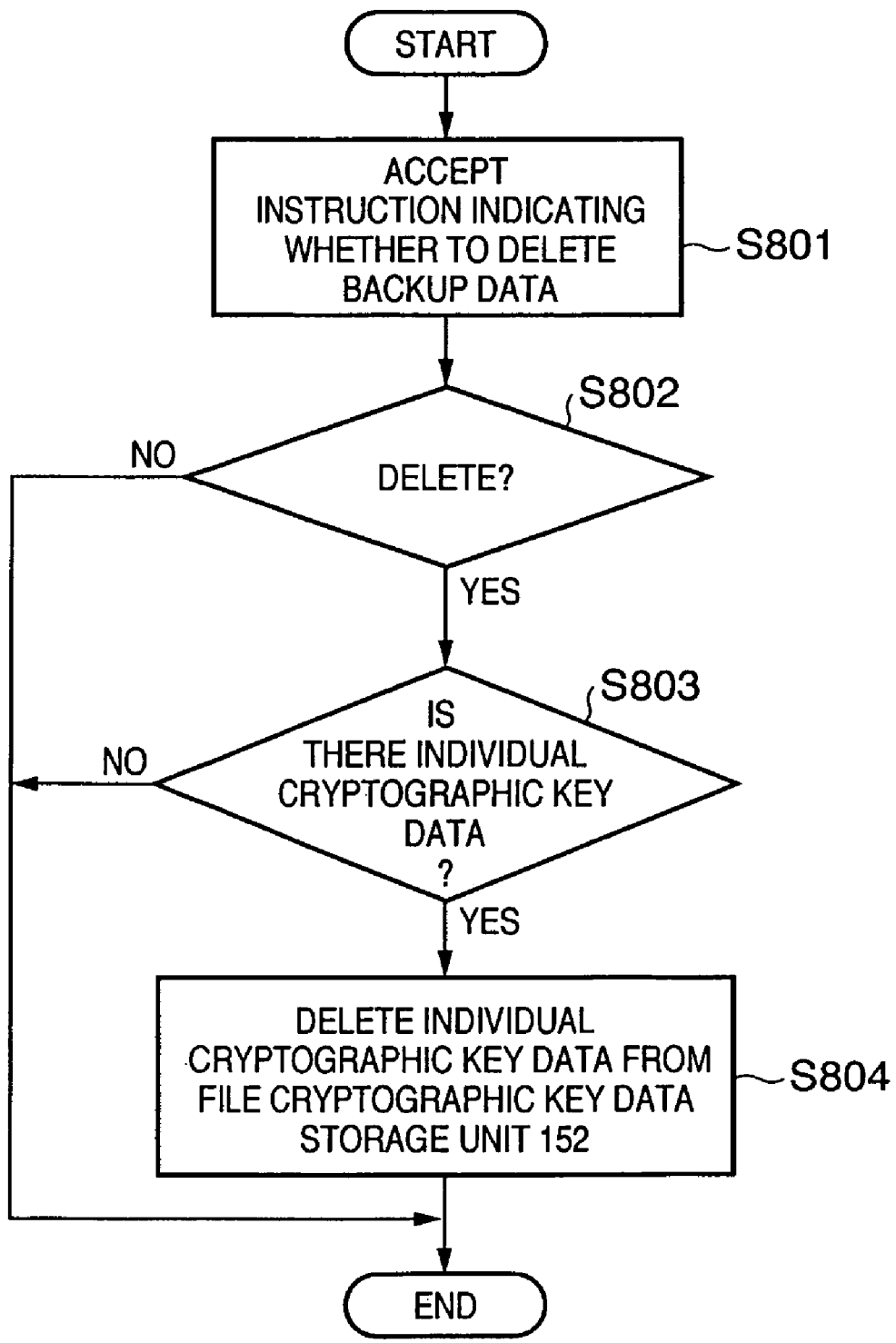
FIG. 8 is a flowchart showing an example of a file deleting process according to the fourth embodiment of the present invention.

FIG. 8 is a flowchart showing an example of the file deleting process according to this embodiment. This file deleting process is activated by receiving an event from the OS when a file is to be deleted.

First, in step S801, a monitor 108 (708) displays a message which prompts the user to input an instruction indicating whether to delete backup data of a file to be deleted. When the user inputs data indicating whether to delete the backup data from a keyboard 107 (707) in response to the message and the data is accepted, the flow advances to step S802.

In step S802, the accepted data input by the user is checked. If the data designates deletion of the backup data ("YES" in step S802), the flow advances to step S803. If the data does not designate deletion of the backup data ("NO" in step S802), the file deleting process is immediately terminated. In this case, only the file in original data 151 (751) is deleted, so the data in backup data 153 (753) is kept restorable.

In step S803, on the basis of identification data of the file to be deleted, whether the corresponding individual cryptographic key data is stored in an individual cryptographic key data storage unit 501 is determined. More specifically, this process can be performed in the same manner as the process in step S401 of the backup addition processing. If it is determined that the individual cryptographic key data corresponding to the file to be deleted is stored ("YES" in step S803), the flow advances to step S804. If it is determined that no corresponding individual cryptographic key data is stored ("NO" in step S803), the file deleting process is immediately terminated.

In step S804, the individual cryptographic key data is deleted. First, data which changes all bits to 0 is written in a block storing the individual cryptographic key data detected in step S803. Then, the corresponding index data and identification data are deleted from an individual cryptographic key index storage unit 502. After that, the file deleting process is terminated.

In this embodiment as described above, whether to make backup data unusable can be selected when a file is to be deleted. Therefore, a file to be made unusable can be reliably made unusable together with its backup. On the other hand, for a file to be restored in the future, its backup is left restorable.

Referring to FIG. 8, whether to delete individual cryptographic key data is selected by the user whenever a file is to be deleted. However, the present invention is not limited to this form. For example, it is also possible to set whether to delete individual cryptographic key data when a new file is to be formed, and execute the deleting process on the basis of the set contents if deletion is designated. The same setting may also be performed for each file after the file is formed, or for each directory storing files. When the setting is performed for each directory, if deletion of a file in a certain directory is designated, the deleting process can be performed by referring to the setting for the director storing the file.

Note that even when individual cryptographic key data is to be deleted not only when a file is deleted but also when a file is changed (updated or/and moved), it is similarly possible to select whether to delete the individual cryptographic key data.

If individual cryptographic key data is not deleted when, e.g., a file is deleted, the file before the deletion remains in backup data 153 (753). After the file is deleted, however, the process of deleting the individual cryptographic key data may also be performed. For example, it is possible to preset a period (data storage period) during which backup data of a file deleted from the original data 151 (751) is stored, and monitor whether this data storage period has elapsed after a file is deleted. If the data storage period has elapsed after a certain file is deleted, individual cryptographic key data corresponding to the file can be deleted from a file cryptographic key data storage unit 152 (752). Accordingly, even when individual cryptographic key data is not deleted when a file is deleted, restoration of backup data corresponding to the file can be prevented after a predetermined period has elapsed.

[Fifth Embodiment]

In any of the first to fourth embodiments described above, if the external hard disk device 105 or 705 including the file cryptographic key data storage unit 152 or 752 is damaged, the file cryptographic key data storage unit 152 or 752 is lost. In this case, the backup data 153 or 753 cannot be restored any longer. Therefore, the characteristic feature of this embodiment is to doubly store a file cryptographic key data storage unit 152 or 752.

For example, data corresponding to the file cryptographic key data storage unit 152 or 752 is also stored in a hard disk drive 104 or 704 holding original data 151 or 751. Accordingly, in the process of generating individual cryptographic key data of a file or the process of deleting individual cryptographic key data, write or deletion to file cryptographic key data is performed to always maintain the sameness of the two data.

When only one hard disk drive or hard disk device is usable, data corresponding to the file cryptographic key data storage unit 152 or 752 can be stored in a rewritable offline medium such as a DVD-RAM or memory card. In this case, only when the offline medium storing file cryptographic key data is mounted on a reading/writing apparatus of the medium, it is possible to execute a process (e.g., a file deleting process) of changing the file cryptographic key data storage unit 152 or 752.

Generally, the data size of the file cryptographic key data storage unit 152 or 752 is much smaller than that of the backup data 153 or 753. This allows the file cryptographic key data storage unit 152 or 752 to have a plurality of file cryptographic key data as in this embodiment.

Also, if the file cryptographic key data is copied by an unauthorized party, backup data of a file deleted from the original data 151 or 751 is used even when individual cryptographic key data of the file is deleted. To avoid this problem, therefore, it is preferable to encrypt the file cryptographic key data itself before it is stored.

[Sixth Embodiment]

Note that in the above embodiments, the backup data 153 or 753 may also contain meta data of a file in addition to entity data of the file.

Note also that in the above embodiments, it is possible not only to process a single file as a data item, but also to collectively process a plurality of files as one data item. For example, it is possible to process a directory as one data item, and encrypt all files arranged in a certain directory by using the same individual cryptographic key data.

In addition, it is possible not only to process individual files managed by the OS as data items, but also to process data managed by a data management system such as a document management system as data items. Similarly, records managed by a database management system may also be processed as data items. In an embodiment like this, the functions implemented by the OS in the above embodiments are achieved by the data management system or database management system. It is also possible to incorporate the processing as explained in the above embodiments into the data management system or database management system.

Furthermore, the original data 151 and 751, file cryptographic key data storage unit 152 or 752, and backup data 153 or 753 may also be stored in different devices or media, because they are preferably stored in physically different devices. These data and units may also be stored in a plurality of information processing apparatuses or personal computers which are not connected to the same information processing apparatus or personal computer but connected across a network, or in devices connected to these information processing apparatuses or personal computers.

[Other Embodiments]

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2005-214329 filed on Jul. 25, 2005, which is hereby incorporated by reference herein.

What is claimed is:

1. An information processing apparatus comprising:
   an encryption unit constructed to generate a plurality of encrypted files by encrypting each of a plurality of original files are stored in a first rewritable storage device, wherein the plurality of encrypted files is generated using each of a plurality of unique cryptographic keys stored in a second rewritable storage device, and wherein each of the plurality of the encrypted files is associated with a respective one of the plurality of the unique cryptographic keys;
   a writing unit constructed to write the plurality of the encrypted files into a single write-once storage device which consists of unrewritable blocks;
   an acceptance unit constructed to accept an instruction which instructs to update one of the plurality of the original files;
   an update unit constructed to update the one of the plurality of the original files in accordance with the accepted instruction; and
   a deletion unit constructed to delete one of the plurality of the unique cryptographic keys, wherein the key to be deleted is associated with the one of the plurality of encrypted files which was generated by encrypting the one original file which is the subject of updating in accordance with the accepted instruction, without deleting others of the plurality of unique cryptographic keys from the second rewritable storage device and without updating the encrypted files which have been written in the single write-once storage device, so that the encrypted files become partially unavailable and are kept as partially available and so that both the unavailable encrypted files and the available encrypted files are written in the same single write-once storage device, wherein at least one processor executes steps stored in a memory to function as at least one of the units.

2. The apparatus according to claim 1, further comprising a setting acceptance unit constructed to accept a setting concerning whether to delete, from said second rewritable storage device, the one cryptographic key associated with one of the plurality of the encrypted files generated by encrypting the one of the plurality of the original files which is the subject of updating in accordance with the accepted instruction,
   wherein said deletion unit is further constructed to delete the one cryptographic key when the setting indicates that the one cryptographic key is to be deleted from said second rewritable storage device.

3. The apparatus according to claim 2,
   wherein if the setting indicates that the one cryptographic key is not to be deleted from said second rewritable storage device, the update unit updates only the one of the plurality of the original files from said first rewritable storage device, without deleting any the plurality of the cryptographic keys.

4. The apparatus according to claim 3, wherein even if the setting indicates that the one cryptographic key is not to be deleted from said second rewritable storage device, said deletion unit deletes the one cryptographic key from said second rewritable storage device after a predetermined period has elapsed since one of the plurality of the original files is deleted.

5. The apparatus according to claim 1, wherein said first rewritable storage device is physically different from said second rewritable storage device.

6. The apparatus according to claim 1, further comprising:
   a decryption unit constructed to decrypt one of the plurality of encrypted files written in the single write-once storage device, but not to decrypt an encrypted file generated by encrypting the one of the plurality of original files which is the subject of updating in accordance with the accepted instruction.

7. A non-transitory computer-readable storage medium stores a computer program which causes a processor to perform:
   an encryption step of generating a plurality of encrypted files by encrypting each of a plurality of original files which are stored in a first rewritable storage device, wherein the plurality of encrypted files is generated using each of a plurality of unique cryptographic keys stored in a second rewritable storage device, and wherein each of the plurality of the encrypted files is associated with a respective one of the plurality of unique cryptographic keys;
   a first writing step of writing the plurality of the encrypted files into a single write-once storage device which consists of unrewritable blocks;
   an acceptance step of accepting an instruction which instructs to update one of the plurality of the original files;
   an update step of updating the one of the plurality of the original files in accordance with the accepted instruction;
   a deletion step of deleting one of the plurality of the unique cryptographic keys, wherein the key to be deleted is associated with the one of the plurality of encrypted files which was generated by encrypting the one original file which is the subject of updating in accordance with the accepted instruction, without deleting others of the plurality of unique cryptographic keys from the second rewritable storage device and without updating the encrypted files which have been written in the single write-once storage device, so that the encrypted files become partially unavailable and are kept as partially available, and so that both the unavailable encrypted files and the available encrypted files are written in the same single write-once storage device.

8. A control method of an information processing apparatus comprising: using a processor to perform the steps of:
   an encryption step of generating a plurality of encrypted files by encrypting each of a plurality of original files which are stored in a first rewritable storage device, wherein the plurality of encrypted files is generated using each of a plurality of unique cryptographic keys stored in a second rewritable storage device, and wherein each of the plurality of the encrypted files is associated with a respective one of the plurality of unique cryptographic keys;
   a first writing step of writing the plurality of the encrypted files into a single write-once storage device which consists of unrewritable blocks;
   an acceptance step of accepting an instruction which instructs to update one of the plurality of the original files;

an update step of updating the one of the plurality of the original files in accordance with the accepted instruction;

a deletion step of deleting of the plurality of the unique cryptographic keys, wherein the key to be deleted is associated with the one of the plurality of encrypted files which was generated by encrypting the one original file which is the subject of updating in accordance with the accepted instruction, without deleting others of the plurality of unique cryptographic keys from the second rewritable storage device, and without updating the encrypted files which have been written in the single write-once storage device, so that the encrypted files become partially unavailable and are kept as partially available, and so that both the unavailable encrypted files and the available encrypted files are written in the same single write-once storage device.

9. The apparatus according to claim 1,
wherein the encryption unit is constructed to generate a new encrypted file by encrypting the original file stored in the first rewritable storage device which was the subject of the updating, and
wherein the writing unit is constructed to write the new encrypted file into the single write-once storage device, without deleting or updating the one of the plurality of the encrypted files which was generated by encrypting the one of the plurality of the original files which was the subject of the updating in accordance with the accepted instruction.

* * * * *